March 1, 1927.
J. FEJÉS
1,619,609
CHASSIS FRAMING MORE PARTICULARLY FOR MOTOR VEHICLES
Filed April 7, 1926 2 Sheets-Sheet 1
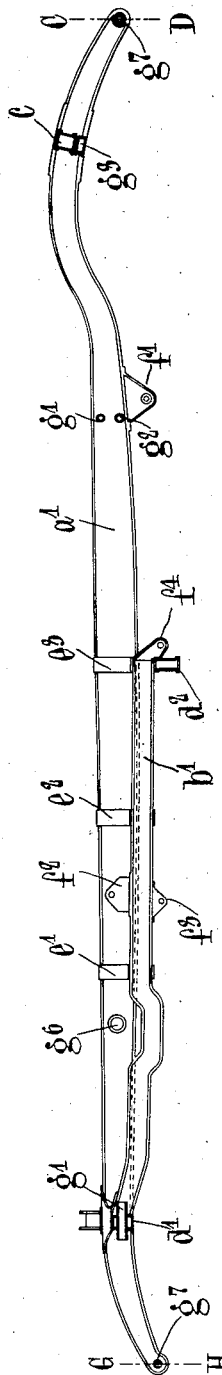
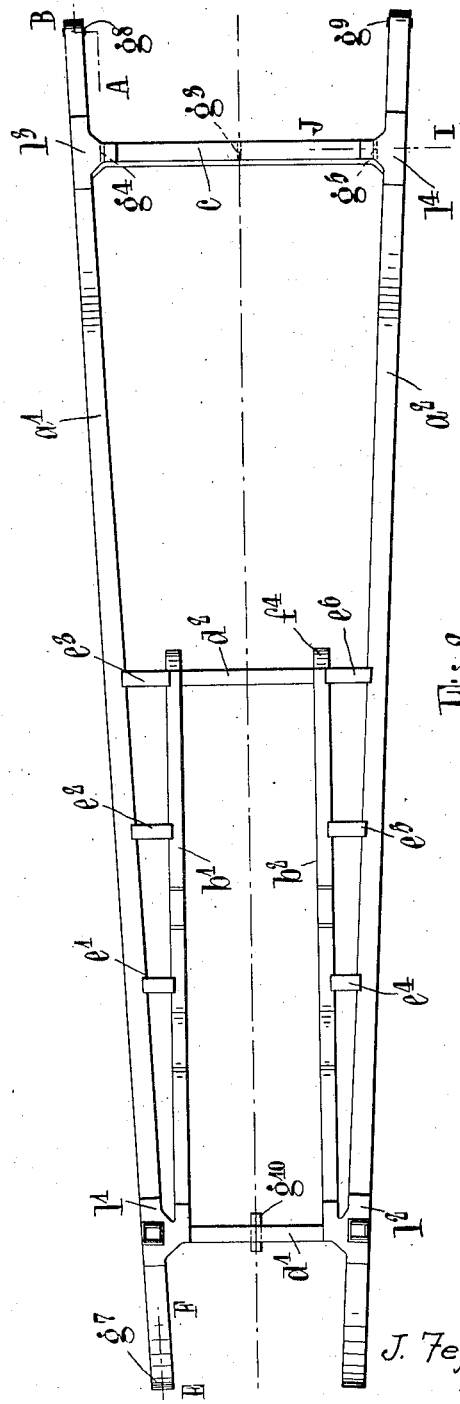
J. Fejés
INVENTOR
By: Marks & Clerk
Attys March 1, 1927.
J. FEJÉS
1,619,609
CHASSIS FRAMING MORE PARTICULARLY FOR MOTOR VEHICLES
Filed April 7, 1926    2 Sheets-Sheet 2
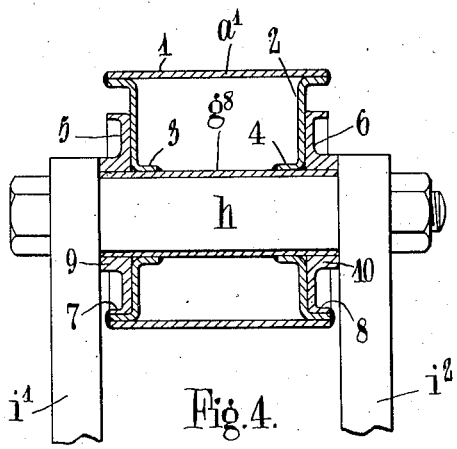
Fig.4.
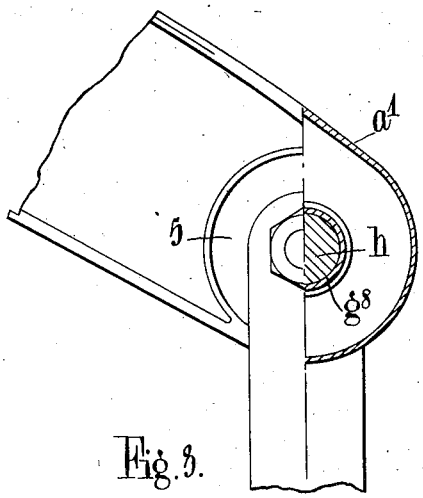
Fig.3.
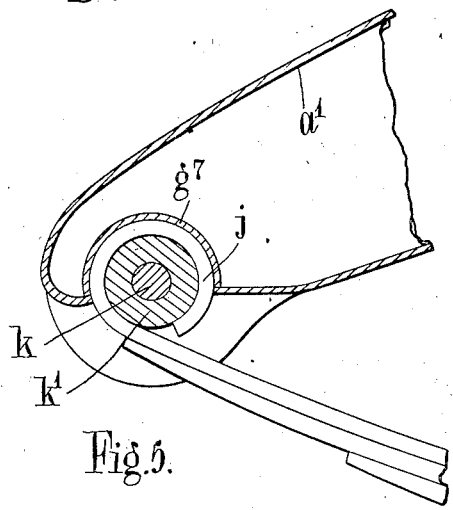
Fig.5.
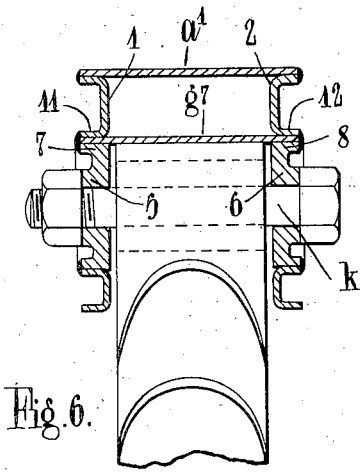
Fig.6.
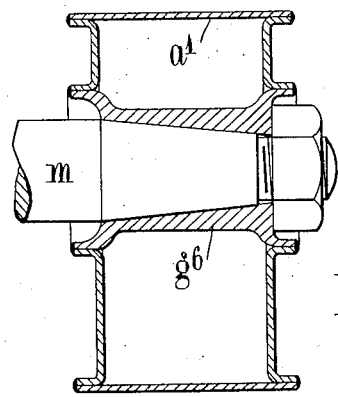
Fig.7.
Fig.8.
J. Fejés
INVENTOR
By Marks & Clerk
Attys Patented Mar. 1, 1927.

1,619,609

UNITED STATES PATENT OFFICE.

JENÖ FEJÉS, OF BUDAPEST, HUNGARY.

CHASSIS FRAMING MORE PARTICULARLY FOR MOTOR VEHICLES.

Application filed April 7, 1926, Serial No. 100,435, and in Great Britain March 19, 1926.

This invention relates to improvements in or modifications of the chassis framing for vehicles, more particularly for motor vehicles, having girders composed of flat sheet metal plates welded together, the size of the said plates being graduated to correspond to the loads which the walls have to support.

The main object of the present invention is to provide means which will allow the height of the girders and thereby the weight and the cost of manufacture to be reduced without reducing the moments of inertia or which will substantially increase the moments of inertia of the girders without altering the system of construction.

With the above object in view one feature of the invention consists in interconnecting opposite plates of the girders, and more particularly opposite side plates, by means of stiffening members which are preferably, but not necessarily hollow, and which are preferably arranged at or in the proximity of the supporting points.

Another feature of the invention consists in utilizing the stiffening members not only for increasing the moments of inertia but also for fulfilling other useful purposes, such as supports for the main springs, bearing for the toothed sector used in conjunction with the steering column, etc.

A still further feature of the invention consists in the provision of special reinforcing plates welded onto the longitudinal and transverse girders at the points where the said girders are connected together.

The invention also consists in the improved construction of chassis frame as hereinbefore more particularly described with reference to the accompanying drawings, in which, Figures 1 and 2 are respectively a sectional elevation and a plan view of the improved chassis frame, Figures 3 and 4 are respectively a sectional elevation and a transverse section of the rear spring support taken along the line A—B in Figure 2 and along the line C—D in Figure 1, Figures 5 and 6 are similar views of the front spring support taken along the line E—F of Figure 2 and along the line G—H of Figure 1 respectively, and Figure 7 is a transverse section through one of the longitudinal girders in the plane of one of the stiffening members showing the latter utilized as a support for a part of the vehicle steering gear.

Fig. 8 is a transverse cross section along the line I—J of Figure 2 showing the connection between a longitudinal and transverse girder.

Referring to Figures 1 and 2, $a_1$, $a_2$ are the longitudinal girders of the main frame and $b_1$, $b_2$ the longitudinal girders of the auxiliary frame on which the engine is mounted. $c$ is a transverse girder which connects the longitudinal girders $a_1$, $a_2$ together. $d_1$, $d_2$ are transverse girders which connect the longitudinal girders $b_1$, $b_2$, whilst $e_1$, $e_2$, $e_3$, $e_4$, $e_5$, $e_6$ are short transverse members which connect the longitudinal girders $b_1$, $b_2$ of the auxiliary frame to the longitudinal girders $a_1$, $a_2$ of the main frame. All these girders and transverse members are constructed of flat sheet metal plates which are welded together to form box-like members of hollow double T—T form.

The inertia moments of the girders are increased by the provision of transverse stiffening members preferably in the form of tubes, which are welded at their ends into opposite sheet metal plates. Such stiffening members are shown at $g_1$, $g_2$, $g_3$, $g_4$, $g_5$, $g_6$, $g_7$, $g_8$, $g_9$. It is, however, to be understood that the invention is not limited to the number of such stiffening members, nor to the actual positions shown, although preferably they are arranged at or in the proximity of the points that are used as supports.

Referring to Figures 3 and 4, the same illustrate the use of a stiffening member $g_8$ as a support for one of the rear main springs through the intermediary of a bolt $h$ passing through it and side plates $i_1$, $i_2$. The side sheet plates 1 and 2 of the longitudinal girder $a_1$ are formed with holes to receive the stiffening member $g_8$, and are provided with internally projecting flanges 3, 4, the said stiffening member $g_8$ projecting beyond the sides of the girder and being surrounded by thicker plates 5, 6 having flanges 7, 8, the edges of which are welded onto the edges of the metal strips of the girder $a_1$. The edges of the inner flanges 9, 10 of the plates 5, 6 are made flush with the edges of the tubular member $g_8$.

Referring to Figures 5 and 6 which illustrate the use of a stiffening member as a support for one of the front main springs, the tubular stiffening member $g_7$ is recessed at its lower end to allow the end $j$ of the spring to be introduced therein and be attached to a bolt $k$ which passes through the said stiffening member and is surrounded by a sleeve $k_1$. The bolt $k$ is supported on plates 5, 6 which are constructed in the manner described with reference to Figures 4 and 5, with the exception that they fit inside the tubular stiffening member, instead of being mounted outside the same. The edges of the external flanges 7, 8 of the plates 5, 6 are welded onto the edges of the stiffening member $g_7$ and onto the edges of flanges 11, 12 formed on the side metal strips 1, 2 of the girder $a_1$.

Referring to Figure 7 which illustrates a stiffening member $g_6$ serving as a bearing for the toothed sector used in connection with the steering column, the shaft $m$ of the toothed sector is mounted in a bearing formed by the tubular member $g_6$ which is welded at its edges onto the two opposite metal strips of the girder $a_1$.

Figures 1 and 2 also show other stiffening or reinforcing members. Thus $g_{10}$ is a tubular stiffening member provided in the transverse girder $d_1$ and serving for the passage of the crank handle. Further $f_1$, $f_2$, $f_3$, $f_4$ are boxes of sheet metal welded onto the girders and serving for the purpose of increasing the moments of inertia of the whole of the structure and at the same time serving as supports or attachments. Figures 1 and 2 also show plate-like stiffening members $l_1$, $l_2$, $l_3$, $l_4$, which are welded onto the surfaces of the longitudinal and transverse girders $a_1$, $a_2$, $d_1$, $c$ at their points of connection with one another. The said plates are substantially T-shaped and provided both on the upper and on the lower surfaces of the girders, as shown in Figure 7.

I wish it to be understood that the invention is not limited to the details of construction hereinbefore described with reference to the accompanying drawings, as the same may be modified in various respects without in any way departing from the spirit of the invention. Thus for instance although the stiffening members have preferably been shown hollow or of tubular shape and such as to be capable of being utilized also for other purposes, they may be made entirely solid instead of hollow and be arranged to connect the upper with the lower plates of the girders instead of or in addition to connecting the side plates thereof.

What I claim is:—

1. A chassis framing for vehicles having girders composed of flat sheet metal plates welded together and stiffening members connecting opposite sheet metal plates of the individual girders, for the purposes set forth.

2. A chassis framing for vehicles as claimed in claim 1 and in which the stiffening members are arranged near the supporting points of the chassis framing.

3. A chassis framing for vehicles as claimed in claim 1 and in which the stiffening members are made hollow, for the purposes set forth.

4. A chassis framing for vehicles as claimed in claim 1, in which the stiffening members are made hollow and some of them serve as supports for the main springs of the chassis framing, as set forth.

5. A chassis framing for vehicles having girders composed of flat sheet metal plates welded together, one of the girders having a hollow stiffening member serving as a self contained bearing for wholly supporting the toothed sector used with the steering column of the vehicle as set forth.

6. A chassis framing for vehicles having hollow double TT longitudinal and transverse girders composed of flat sheet metal plates welded together and substantially T-shaped reinforcing plates facially applied upon the top and bottom of the longitudinal and transverse girders and welded along their edges onto the longitudinal and transverse girders at the points where the said girders are connected together to prevent weaving of the chassis.

In testimony whereof I have signed my name to this specification.

JENŐ FEJÉS.